United States Patent
Lacalle Bayo

(10) Patent No.: US 8,973,198 B2
(45) Date of Patent: Mar. 10, 2015

(54) VEHICLE FOR CLEANING MIRRORS IN INSTALLATIONS FOR COLLECTING SOLAR THERMAL ENERGY

(75) Inventor: Jesús Lacalle Bayo, Valencia (ES)

(73) Assignee: Logistica y Acondicionamientos Industriales, S.A.U., Valencia (ES)

( * ) Notice: Subject to any disclaimer, the term of this patent is extended or adjusted under 35 U.S.C. 154(b) by 178 days.

(21) Appl. No.: 13/885,501

(22) PCT Filed: Nov. 15, 2010

(86) PCT No.: PCT/ES2010/070733
§ 371 (c)(1),
(2), (4) Date: May 29, 2013

(87) PCT Pub. No.: WO2012/066154
PCT Pub. Date: May 24, 2012

(65) Prior Publication Data
US 2013/0239343 A1    Sep. 19, 2013

(51) Int. Cl.
*B08B 11/00*    (2006.01)
*F24J 2/46*    (2006.01)

(52) U.S. Cl.
CPC . *F24J 2/461* (2013.01); *Y02E 10/40* (2013.01)
USPC .............. 15/77; 15/21.1; 134/104.2

(58) Field of Classification Search
USPC ............... 15/3, 21.1, 77, 102; 134/104.2
See application file for complete search history.

(56) References Cited

U.S. PATENT DOCUMENTS

| | | | |
|---|---|---|---|
| 5,794,298 A * | 8/1998 | Fugel et al. | 15/53.2 |
| 8,650,693 B2 * | 2/2014 | Singh et al. | 15/77 |
| 8,771,432 B2 * | 7/2014 | Meller et al. | 134/56 R |
| 2013/0206167 A1 * | 8/2013 | Mor et al. | 134/6 |

FOREIGN PATENT DOCUMENTS

| | | |
|---|---|---|
| CH | 598422 A5 | 4/1978 |
| DE | 102004036094 A1 | 2/2006 |
| DE | 202007001488 U1 | 4/2007 |
| EP | 0394770 A2 | 10/1990 |
| ES | 2267393 A1 | 3/2007 |
| ES | 2316317 A1 | 4/2009 |
| WO | 2010/106195 A1 | 9/2010 |

* cited by examiner

*Primary Examiner* — Randall Chin
(74) *Attorney, Agent, or Firm* — Richard M. Goldberg

(57) ABSTRACT

A vehicle for cleaning collector mirrors in solar thermal energy installations, includes an operating cab (2), a body (3) for housing and holding the different items, a rolling system for moving the vehicle, a clean water tank, an assembly for discharging the clean water, at least one structure for spraying clean water (100)) onto the surfaces of the mirrors (22) and a tray (46) for collecting the water used in cleaning the mirrors; a set of lifting columns (5, 6); and supports (53, 63) for the cleaning and/or drying assemblies able to slide along the lifting columns, and in which the cleaning assembly includes a structure fitted with a rigid bar (91), which assumes the profile of the mirror to be cleaned, the bar being provided with an external rotation assembly for a brush.

18 Claims, 9 Drawing Sheets

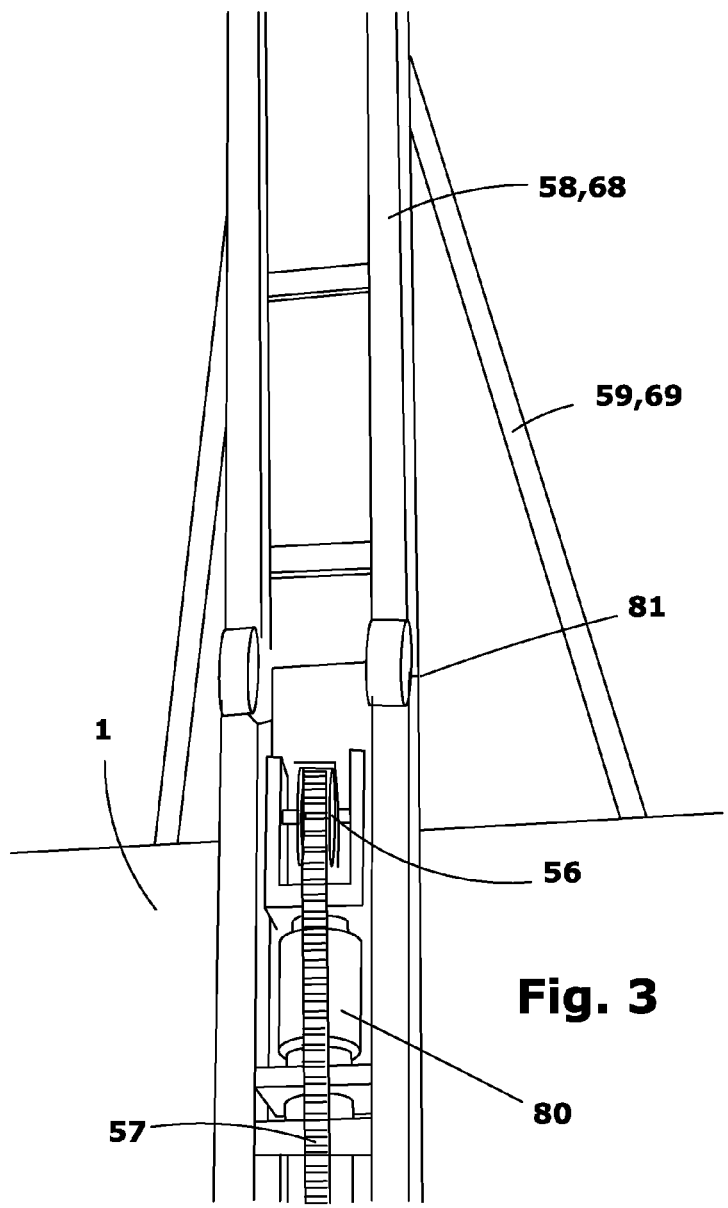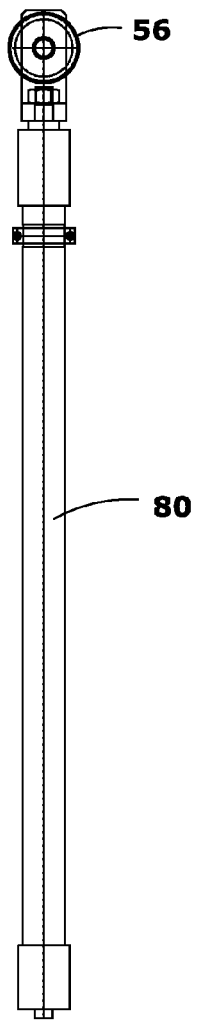

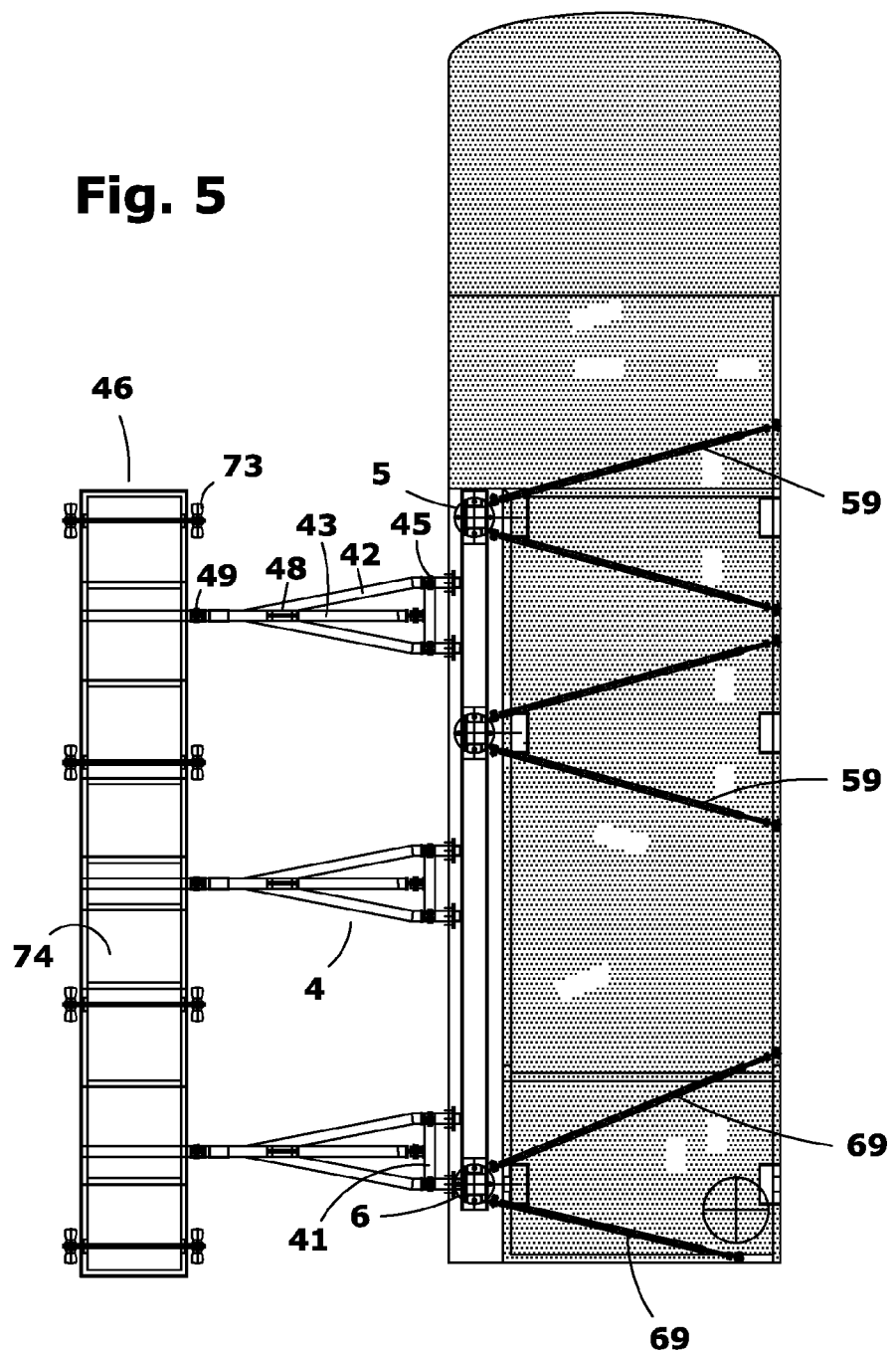

VEHICLE FOR CLEANING MIRRORS IN INSTALLATIONS FOR COLLECTING SOLAR THERMAL ENERGY

BACKGROUND OF THE INVENTION

This invention consists of a vehicle for cleaning the mirrors which form a normally parabolic-shaped body with a horizontal generatrix and a curved-concave section, which are able to rotate in respect of a horizontal shaft sustaining said mirrors, with said shaft being secured to the ground.

STATE OF THE ART

Installations already exist for cleaning glass surfaces such as window fittings or building skylights, working by wiping with or without water.

DE 10 2004 036094 consists of a mirror cleaning device for solar installations which is guided on tracks and consists of a fixed structure for cleaning the mirrors by means of spraying water onto these, as well as also comprising a tank for collecting the used water. Though cleaning brushes are shown in its FIG. 12, these brushes are not adaptable to the surface of the mirror, but instead adopt two independent flat portions. No details are given about this brush, with only its existence being stated.

DE 20 2007 001 488 U1 describes a device for cleaning flat solar panels set up on the roofs of buildings and is provided with a rotating brush, also flat.

SUMMARY OF THE INVENTION

This invention consists of a vehicle for cleaning collector mirrors in installations for collecting solar energy which comprises:

- An operating cab; normally the vehicle will be based on a conventional truck, and for this reason the operating cab will be the cab of said truck;
- A rolling system for moving the vehicle; the rolling system can be wheels or chains or conveyor belts, like caterpillar tracks. One of the problems involved in cleaning solar installations is that the ground tends to be muddy. The constant movement of vehicles leads to ruts being made, which prevents easy maneuvering. The problem is worsened when the effect of rain or the water used for cleaning the mirrors makes the soil go soft and muddy. This can make the maneuvering capacity extremely difficult. For this reason, when a vehicle is specifically built for an installation and does not need to be moved on public thoroughfares, it may be advisable for this to carry transport strips or chains. In spite of the maneuvering difficulties that these vehicles may involve if they are fitted only with wheels, this is however an advantage when the vehicle has to be normally or occasionally moved along public traffic thoroughfares, either from one installation to another, in order to take it to premises for maintenance of the vehicle itself, or to be given official inspections;
- A clean water tank; the purpose of the clean water tank is to hold water to be sprayed onto the surface of the mirrors, to help clean these;
- At least one water sprayer, which can and tends to have multiple nozzles, which issue water under pressure onto the surface of the mirror. The nozzles are normally a regular distance from one another, and set along a curve essentially parallel to that of the mirror being cleaned and on which the water is being sprayed. The distance at which the water is sprayed is from a few to several tens of centimeters. The water spray device is located on an extendible support set on a liftable support. The lifting system will normally be telescopic and is located on one or more masts arranged for this purpose on at least one of the sides of the vehicle;
- A collector for the water used in cleaning the mirror; the collector consists of a fairly shallow tray in which the water sprayed on the mirror is collected, after falling through gravity, or with the aid of a drying device. This tray is located under the lower edge of the mirror and consists of an articulated device enabling this to be secured on the carrying vehicle, or to be extended, so that it goes into a horizontal position to carry out its collecting function. The tray will comprise one or more drainage nozzles allowing the water used to be collected and taken back to a second tank on the vehicle, or to an auxiliary tank placed, for example, in a trailer. Pumping means are designed for emptying the tray into the collection tank, as well as level sensors for stopping said pumping means when the tray is empty or for activation of said pumping means when the level in the tray is sufficiently high;
- Extending means for the water spraying device set in the extendible support in turn placed in the lifting support. These extending means enable the water sprayers to be drawn up to the appropriate distance from the surface of the mirror. The extending means consist of hydraulic or pneumatic cylinders, or of electrical extenders, arranged horizontally, and in a position approximately perpendicular to the lateral surface of the vehicle;
- Means for brushing the surface of the mirror; the brushing means are located, like the water sprayer, on a liftable support;
- A system for extending the means for brushing the surface of the mirror; this extending system is similar to the one used for the water spray device and the brushing means consist of the following items:
  - A concave core or body which substantially matches the shape of the mirror to be brushed;
  - A flexible casing for said core;
  - A set of brushes arranged on said casing;
  - A set of items for joining the brushes together;
  - A set of bearings arranged between the core and the flexible casing;
  - A drive means for the flexible casing of the core; this drive means makes said flexible casing turn around said core; which remains motionless, with the brushes arranged over said flexible casing
- Drying means by air discharge. The extendible supports of the water sprayer, as well as of the brushing means, are optionally able to rotate in respect of said axes perpendicular to the lateral surface of the vehicle. Although the mirrors are symmetrical in respect of a central plane, the upper and lower curvature are also symmetrical, meaning that the curves that have to be adopted by the water sprayer and the brush are also symmetrical at the top in respect of the top; at this point there are several options:
  - The water sprayer and the brushing means are dismantled and assembled inversely for cleaning the upper and lower part, respectively;
  - The water sprayer and the brushing means are made to rotate 180° in respect of a horizontal axis to invert the curvature when going from the upper part to the lower one;

The vehicle consists of two sets of water sprayers and brushing means for simultaneous cleaning of the upper and lower part;

This last option is not very advisable since there are different obstacles in the lines of mirrors, these mainly being the supports of each mirror and the tube collecting the concentrated solar energy. The use of two sets of sprayers and brushing means would require extreme uniformity on the ground and in the movement of the vehicle, which is feasible when there is a perfectly calibrated lane for the vehicle to move along.

BRIEF DESCRIPTION OF THE DRAWINGS

In order to illustrate the following explanation, seven sheets of drawings are enclosed with this descriptive report, in which the essence of this invention is represented in eight figures, and in which:

FIG. 3 shows a schematic view of a detail of the posts for lifting and securing the cleaning items;

FIG. 4 shows a side view of a post for lifting and securing the cleaning means;

FIG. 5 shows an upper view of the vehicle for cleaning mirrors as portrayed in the invention.

DESCRIPTION OF THE DIFFERENT EMBODIMENTS OF THE INVENTION

Figure 1:
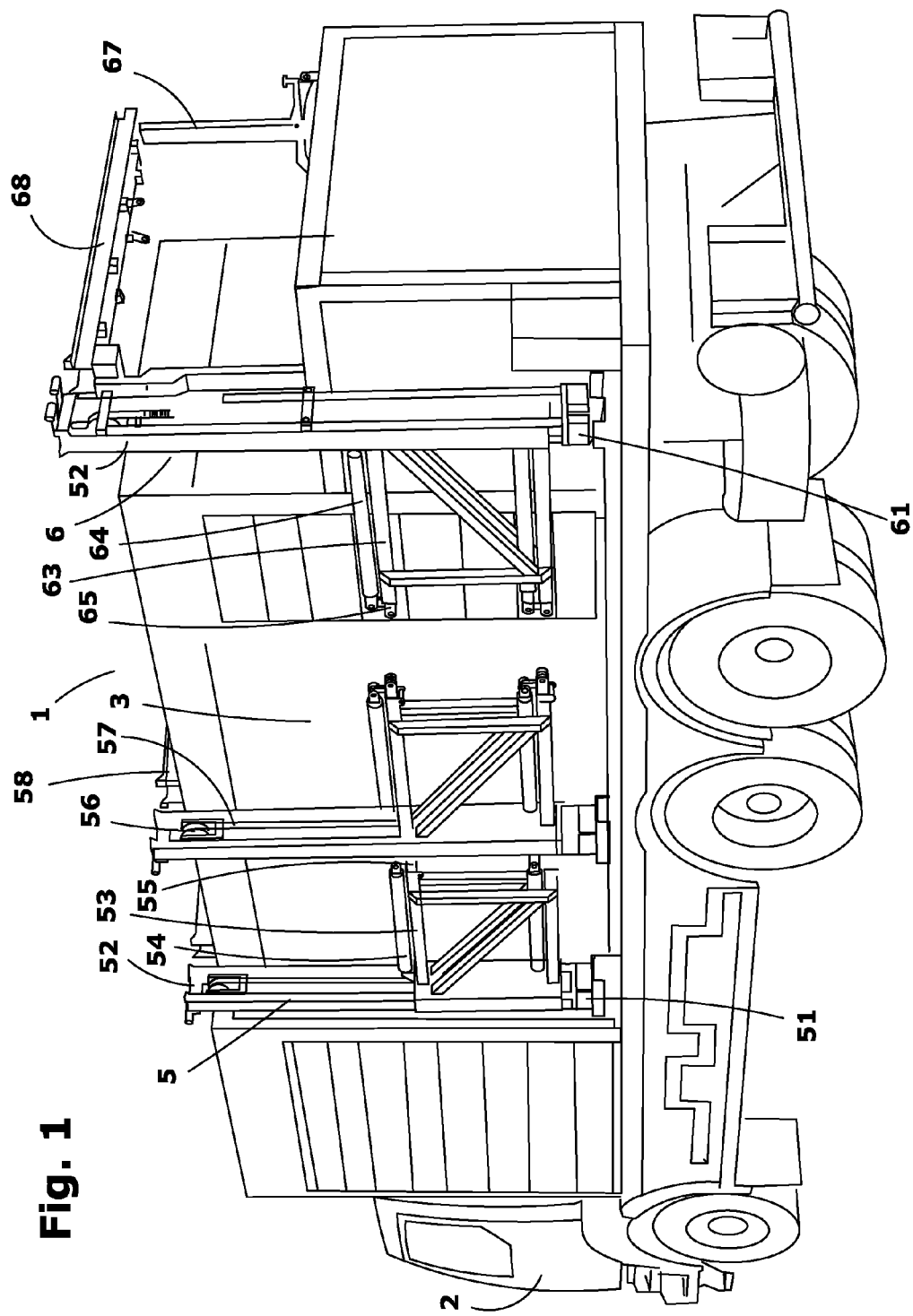
FIG. 1 shows a schematic perspective view of the vehicle for cleaning mirrors according to the invention seen from the rear and from one of its sides, not fitted with the water collection tray and the cleaning items, and with the supports for said cleaning items retracted.
Figure 2:
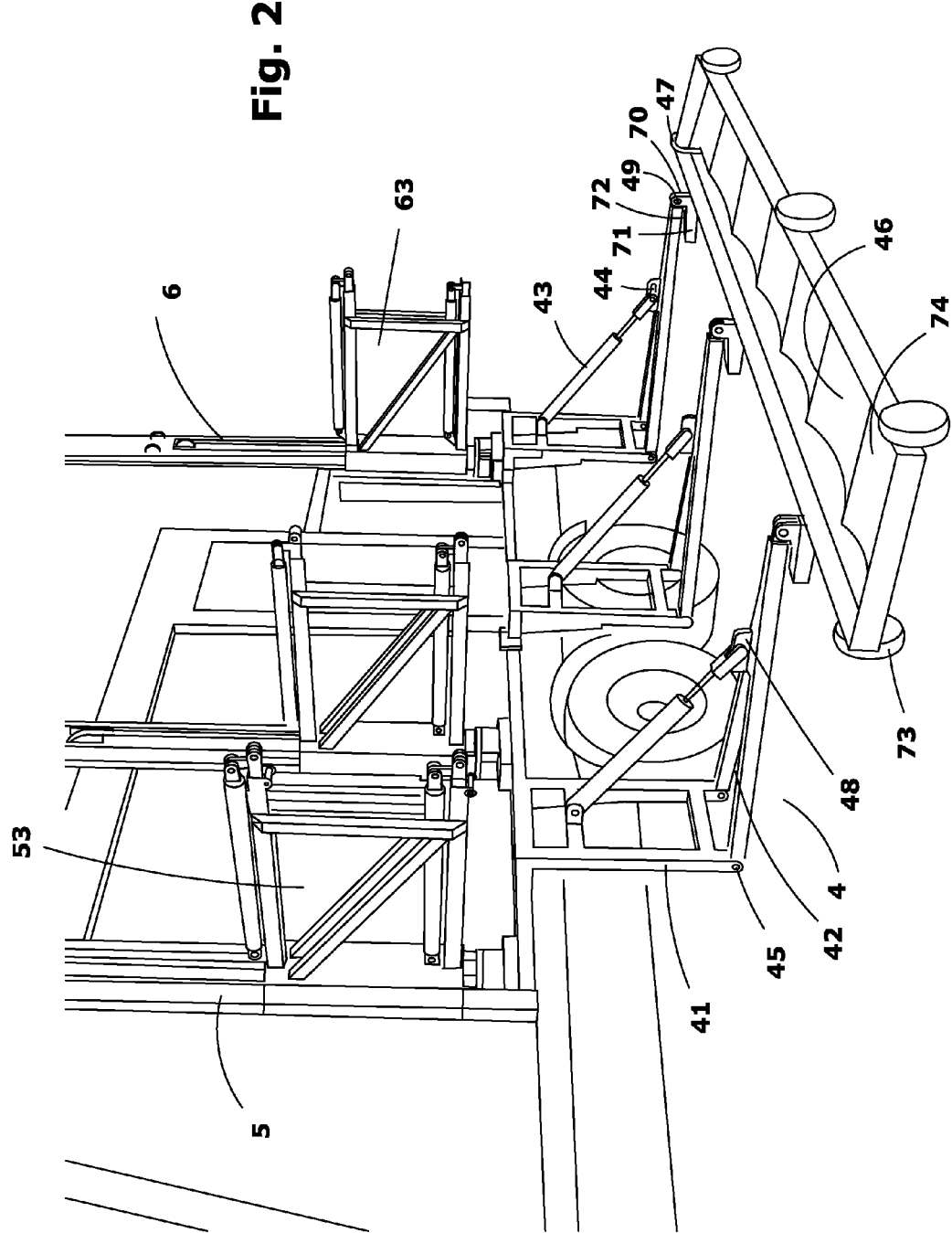
FIG. 2 shows a schematic perspective view of a portion of the vehicle for cleaning mirrors as shown in FIG. 1, but provided with the supports for the cleaning items deployed and also provided with the water collection tray with its corresponding supports.
Figure 6:
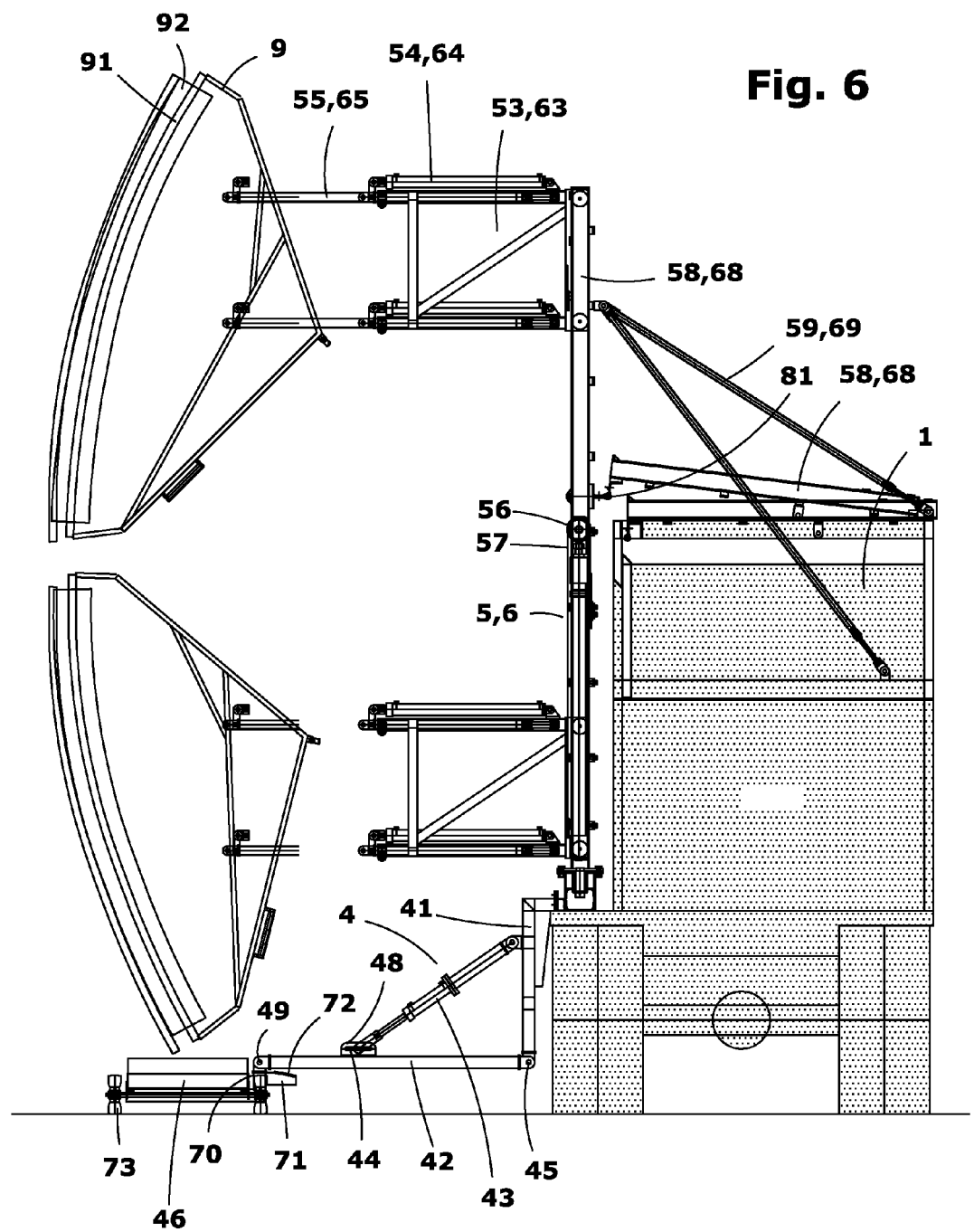
FIG. 6 shows a schematic view from behind the vehicle for cleaning mirrors with the cleaning items in the cleaning position and with the collection tray deployed.
Figure 7:
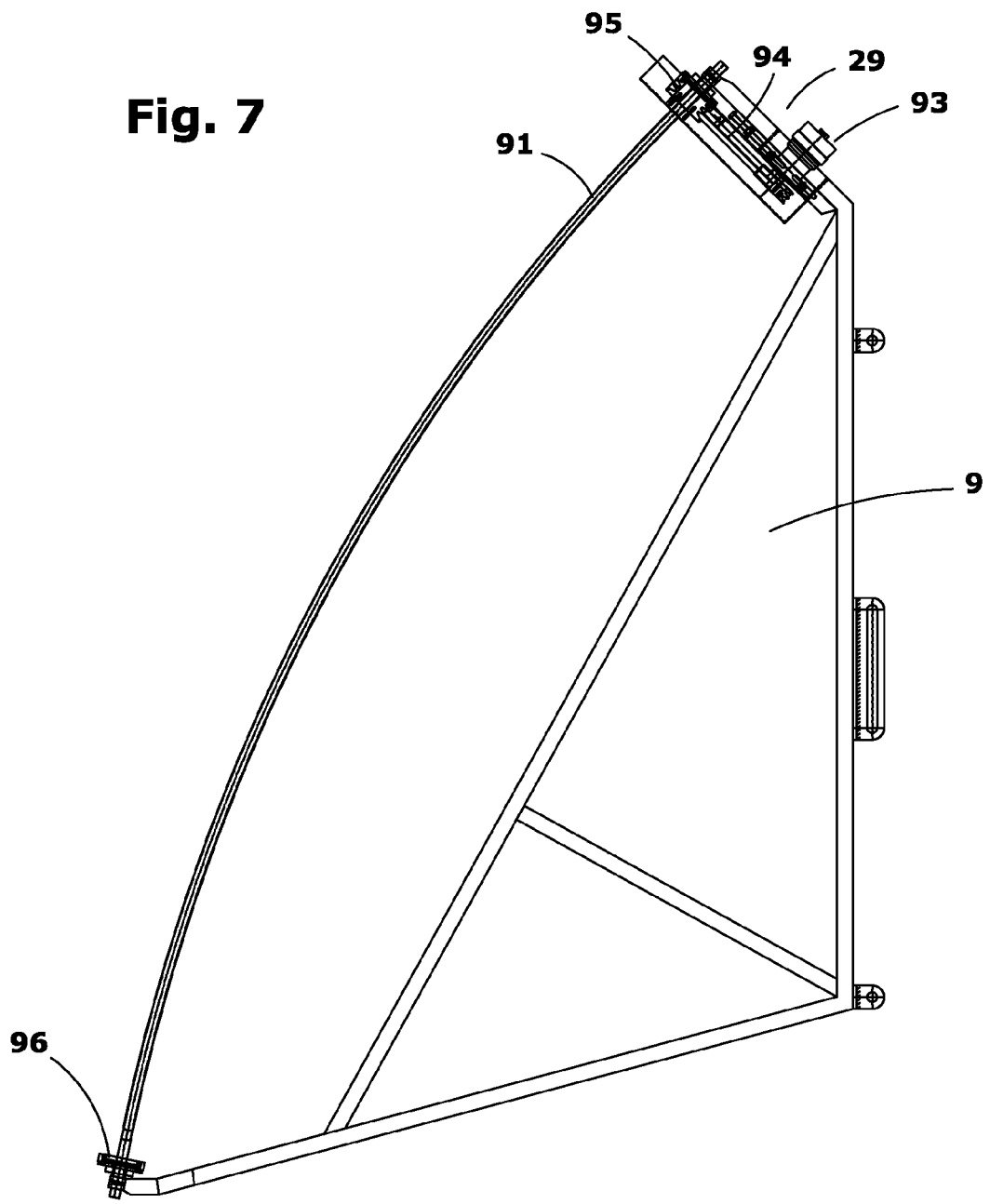
FIG. 7 shows a schematic view of one of the cleaning devices as a support for a cleaning brush, able to be set in both an upper position and in a lower position.
Figure 8:
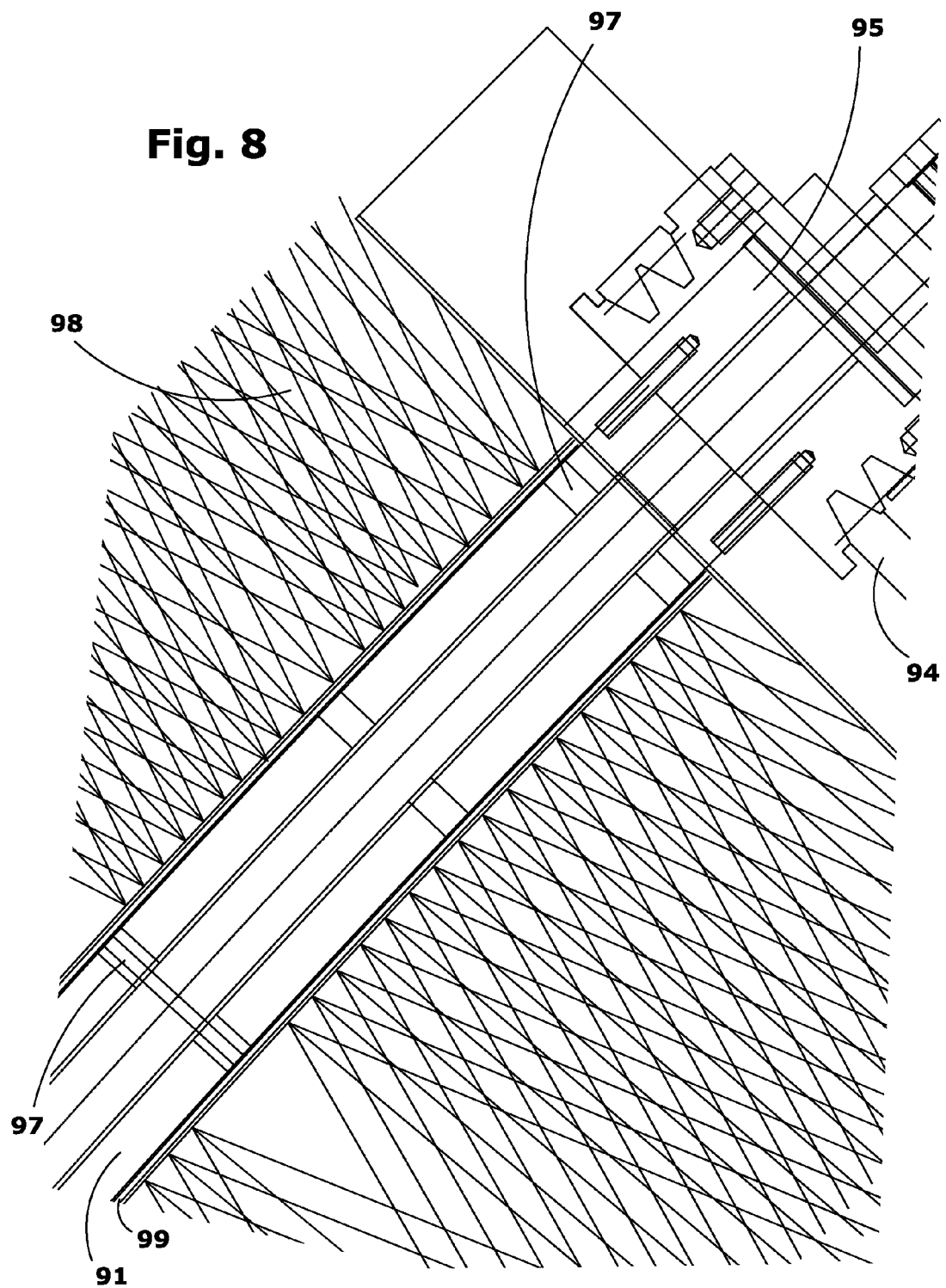
FIG. 8 shows a view of a detail of the assembly of the cleaning device support for a brush as shown in FIG. 7.
Figure 9:
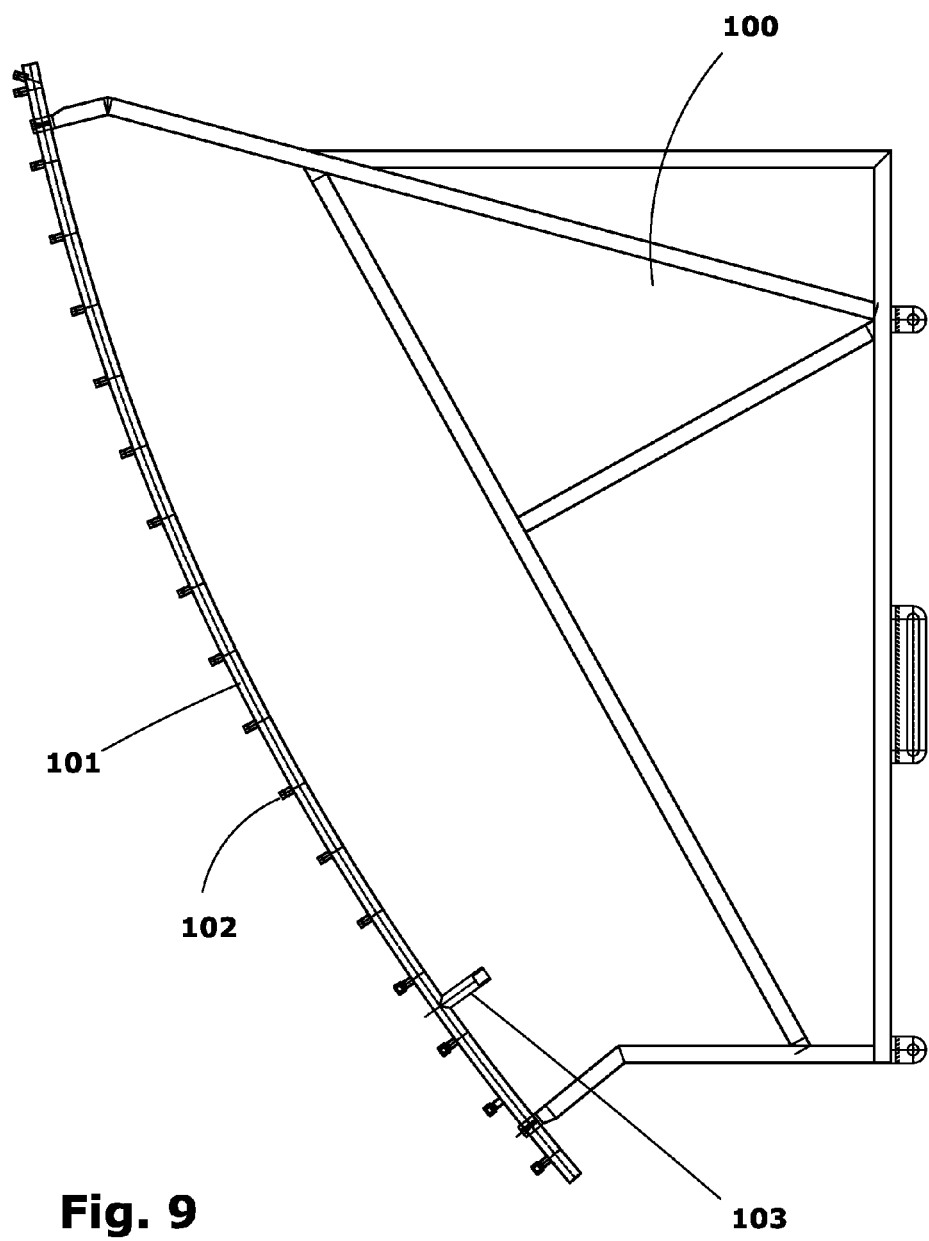
FIG. 9 shows a schematic view of another of the cleaning devices consisting of an arch fitted with a set of spraying nozzles.
Figure 10:
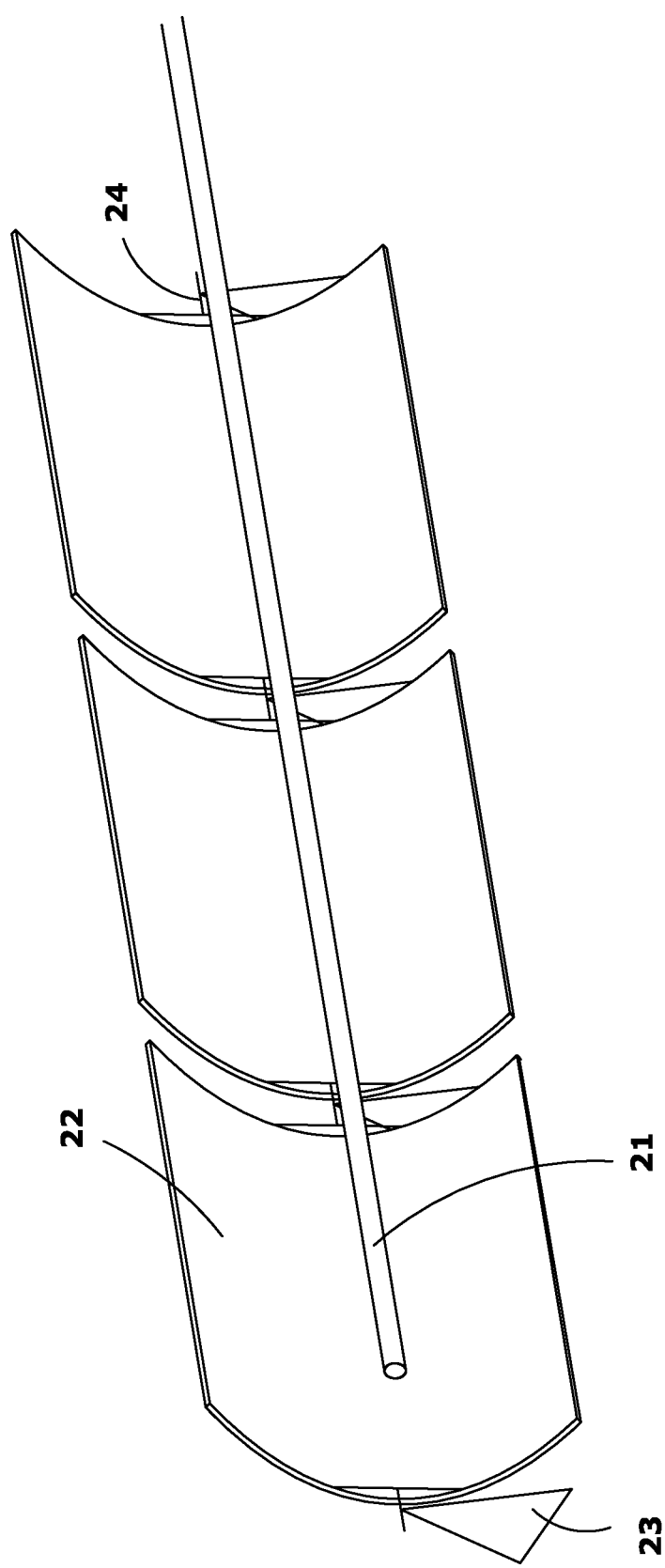
FIG. 10 shows a schematic view of a row of curved-concave mirrors in an installation for collecting solar thermal energy.

As has already been stated, this invention consists of a vehicle (1) for cleaning collector mirrors (22) in installations for collecting solar thermal energy. In these facilities the mirrors are held by a set of supports (23) anchored to the ground, which at generally regular intervals support a shaft (24) on which one or the whole set of mirrors (22) can rotate. The mirrors (22) have a parabolic section, at the focus of which there is a tube for collecting the radiation. The tube can be made of glass or of other materials, and is normally made up of two layers, an inner layer through which the thermal fluid flows, which is heated up by the energy supplied by the sun by reflection and concentration of the sun's rays by means of the mirrors (22), and an outer insulating layer. Hence, a row of mirrors (22) in a solar thermal installation does not have a continuous accessible surface, there being instead, along the row, a collector tube (21) and at regular intervals the supports for securing the rotation axis of the mirrors, and also for securing the collector tube.

According to the invention, a vehicle for cleaning collector mirrors in solar thermal energy collection facilities is described, said vehicle comprising:

An operating cab (2); in general, and as has already been stated, the operating cab (2) will be the cab of the corresponding vehicle (1);

A body (3) for housing and holding the different items; this body will be located on the platform of the truck and comprises the different items necessary for this to work, such as a clean water tank, pumping device or means for discharging the clean water, a deposit for collecting used water, possibly a system for purifying collected water, hydraulic, pneumatic systems, and all the control instruments needed for proper performance of the function envisaged;

A rolling system for moving the vehicle; this rolling system can also consist of chains or pulling belts, to facilitate movement in the event of the ground on which the cleaning operation requiring this. In general it will nevertheless be enough to use the conventional rolling systems of the vehicle;

The vehicle also comprises a body for spraying clean water (100) onto the surface of the mirrors (22). The spraying body comprises a hollow bar (101), which takes on a curved profile matching the profile of the mirror to be cleaned, and comprises a set of nozzles (102) spraying clean water; this tube also comprises an inlet nozzle (103) for the water from the corresponding pumping device;

Preferentially, but optionally, the vehicle also comprises a tray (46) for collecting the water used in cleaning the mirrors. However, where there is sufficient water available, this option is not necessary for optimising the results of the intended cleaning process.

The vehicle also comprises a set of lifting columns (5, 6) at least one of which will correspond to the water pumping system, and at least another one will correspond to the brushing means. Another lifting column will also possibly sustain drying means.

On each of the lifting columns there are supports (53, 63) for the cleaning and/or drying means; these cleaning or drying means consist of different structures (100, 9) which respectively comprise the nozzles (102) for spraying water and the brushing means. These supports are able to slide up and down along said lifting columns so that the cleaning position is absolutely adapted to the required height; they will also comprise at least one structure similar to the water sprayer, but from which air will be blown, and in which the nozzles will be made in the shape and angle proving useful.

It is pointed out here that the supports (53, 63) are represented in two different positions in some of the figures. These positions are both possible, but will not normally be simultaneous. Instead only one of these will be used depending on whether the cleaning is being done at the top or the bottom of the mirrors (22).

The lifting columns (5, 6) can have a rotation body (51, 61) at their support base which enables these columns to be properly positioned manually or automatically to carry out the cleaning operation or the ordinary movement of the vehicle. The position for the cleaning operation will normally be the one in which the supports (53, 63) will be angled 90° outwards, in respect of the lateral surface of the vehicle. In the ordinary movement position the supports will lie in parallel to the lateral surface of the vehicle.

Each of the lifting columns (5, 6) is formed of a lower portion (52, 62) at a fixed position of the vehicle, although, as already stated, its position can vary, and an upper portion (58, 68). The upper portion (58, 68) can be dismantled and/or be joined to the lower portion (52, 62) by means of a dismantling articulation device (81).

The vehicle preferably comprises a housing, at the top of the housing body (3) for the upper parts (58, 68), of the lifting columns, in the dismantled position. It also comprises a support body (67) at the rear, behind the body (3) insofar as at least one of the lifting columns is located behind said body (3).

The upper parts (58, 68) of the lifting columns (5, 6) are fitted with different support struts (59, 69) on the housing body (3) so that the forces acting on these upper parts, either through the effect of the wind, of the movement of the vehicle or through supporting the cleaning means, do not produce any deformation of said lifting columns (5, 6) or the breakage of the connection zones.

Each of the lifting columns (5, 6) furthermore comprises an extendible lifting body (80), which is also provided with a pulley wheel (56) operated with a chain (57) for the lifting and lowering operation of the supports for the cleaning and/or drying means (53, 63). This lifting body enables determining the maximum height at which the supports of the cleaning and/or drying means (53, 63) can be set, so that the working height can be properly adjusted by operating the chain (57).

The supports of the cleaning and/or drying means (53, 63) which are able to slide along the lifting columns (5, 6) consist of substantially flat bodies, are extendible by means of different extension bodies (55, 65) with which they are provided, and comprise extending elements (54, 64) normally pneumatic cylinders, though any other option is possible. Said extending elements (54, 64) are provided with at least one pair of anchorages, at their free end, for each of the cleaning means (brushes or water spraying) and/or drying means.

The tray (46) is secured to the vehicle (1) by means of a support assembly (4) which comprises lateral supports (41) fixed to the vehicle provided with different shafts (45) and different sustaining bodies (42) for the tank (46) able to articulate in respect of the side supports (41) in respect of the axes (45). The sustaining bodies (41) comprise different anchorage plates (48) and between said plates (48) and the side supports (41) there is an extending device (43). The anchorage plates (48) have different slots (44) for adjusting the extending device (43), by means of which the maximum angle for retraction or support on the tank floor (46) can be accurately defined. The tank (46) comprises a set of joining bodies (70) for connecting with the free ends of the sustaining bodies (42). Said joining bodies (70) comprise an articulation shaft (49), a lower projection (71) external to the tray (46) and a support surface (72) for the sustaining body (42). When the tray (46) rises or falls these joining bodies (70) prevent this from unintentionally rotating, making this overturn, and requiring it to be lifted up again and secured by an operator before placing this on the ground again. It does nevertheless indeed enable rotating in the other direction for withdrawing to the garage. The tray (46) for collecting the water from cleaning the mirrors preferably has a longitudinal section which is provided with a plurality of concavities (74). This also comprises a set of wheels (73) for pulling it along, and a drainage conduit (47).

One of the cleaning means is formed of a rigid structure (9) which, in its cleaning zone, comprises a bar (91) with the curved-concave shape of the mirror (22) which has to be cleaned. The bar (91) is rigid and fixed on the rigid structure (9) and said rigid bar (9) is surrounded by a body (92) which rotates around said rigid bar. The rotating body comprises a head (29) provided with the rotating means, these being a motor (93) with a conducting pulley wheel, a transmission item (94) such as a belt or a chain, and a driven pulley wheel (95) which rotates around one end of the bar (91) and the opposite end of the bar (91) comprises a free pulley wheel (96), the rotating body (92) being moved by said driven pulley wheel (95) and resting at least on the free pulley wheel (96).

One particularly advantageous configuration is with the rigid bar (91) comprising a plurality of bearings (97) along its whole length. One or more flexible casings (99) are sheathed (one after another) over these bearings (97) so that each flexible casing can freely turn, only having to overcome the elastic force that these flexible casings (99) have. A cleaning brush (98) is placed on the flexible casing (or casings, if there is more than one). In accordance with a preferential embodiment the cleaning brush (98) is formed by the juxtaposition of a set of fragments of brush (cylindrical portions), each of which rests on a portion of flexible casing, resting in turn on the at least two bearings (97) so that there is hardly any deformation of each of said fragments.

What is claimed is:

1. A vehicle for cleaning collector mirrors in installations for collecting solar thermal energy, in which the collector mirrors are held to the ground by a set of supports arranged at normally regular distances, which hold a shaft around which said mirrors are adapted to turn, said mirrors being aligned in rows normally facing north-south and having a collecting surface with a concave section, said collector mirrors being adapted to face east to west during the day, said concave section of the collecting surface having a parabolic section reflecting solar radiation onto a collector tube which covers a focus of a parabola formed by said mirrors, and said vehicle comprising:
    an operating cab;
    a body for housing and holding different items for cleaning said collector mirrors;
    a rolling system for moving the vehicle;
    a clean water tank;
    an assembly for discharging clean water;
    at least one body for spraying clean water onto the surfaces of the mirrors;
    a set of lifting columns; and
    supports for providing at least one of:
        at least one cleaning assembly and
        at least one drying assembly
    able to slide along said lifting columns;
    at least one said cleaning assembly formed of a rigid structure which in a cleaning zone thereof comprises a bar with a curved concave shape of at least one said mirror which is to be cleaned, said bar being rigid and fixed on the rigid structure and said rigid bar being covered with a rotating body which rotates around said rigid bar; and
    the rotating body comprises a rotating head fitted with a motor with a drive pulley, a transmission which includes one of a belt and a chain, and a driven pulley wheel which rotates around one end of the bar, an opposite end of the bar including a free pulley wheel, such that the rotating body being movable by said driven pulley wheel and resting at least on the free pulley wheel,
    wherein the lifting columns comprise a body rotating in respect of a vertical axis by means of which the lifting columns are adapted to move between a retracted position and an operating position.

2. A vehicle for cleaning collector mirrors in installations for collecting solar thermal energy, according to claim 1, wherein the lifting columns are formed of two parts which include a lower part and an upper part.

3. A vehicle for cleaning collector mirrors in installations for collecting solar thermal energy, according to claim 2, wherein the upper part and the lower part of the lifting columns are joined by means of a removable articulation device.

4. A vehicle for cleaning collector mirrors in installations for collecting solar thermal energy, according to claim 3, further comprising a housing, at a top of the housing body for containing the upper part of the lifting column, in a dismantled position.

5. A vehicle for cleaning collector mirrors in installations for collecting solar thermal energy, according to claim 2, wherein the upper part of the lifting columns is provided with different support struts on the housing body.

6. A vehicle for cleaning collector mirrors in installations for collecting solar thermal energy, according to claim 2, wherein each of the lifting columns comprises an extendible lifting body, with said extendible lifting body including a pulley wheel for driving a chain for providing the upward and downward movement of the supports of the at least one of the cleaning and drying assemblies.

7. A vehicle for cleaning collector mirrors in installations for collecting solar thermal energy, according to claim 3, further comprising a support body at a rear of the body for housing and holding different items for cleaning.

8. A vehicle for cleaning collector mirrors in installations for collecting solar thermal energy, according to claim 1, wherein the supports of the at least one cleaning and drying assemblies which are adapted to slide along the lifting columns, include substantially flat bodies, provided with different extending bodies comprising extendable elements, with said extendable elements being provided with at least one pair of anchorages, at free ends thereof, for each of said cleaning and drying assemblies.

9. A vehicle for cleaning collector mirrors in installations for collecting solar thermal energy, according to claim 1, wherein the rigid bar comprises a plurality of bearings along its length, on which a flexible casing is sheathed.

10. A vehicle for cleaning collector mirrors in installations for collecting solar thermal energy, according to claim 9, further comprising a cleaning brush on the flexible casing.

11. A vehicle for cleaning collector mirrors in installations for collecting solar thermal energy, according to claim 10, wherein the cleaning brush is formed of the juxtaposition of a set of fragments of brush, each of which rests on a portion of the flexible casing and which in turn rests on at least two bearings.

12. A vehicle for cleaning collector mirrors in installations for collecting solar thermal energy, according to claim 1, further including a tray for collecting the water used in cleaning the mirrors.

13. A vehicle for cleaning collector mirrors in installations for collecting solar thermal energy, according to claim 12, wherein the tray is held by a support assembly which comprises lateral supports fixed to the vehicle and provided with different shafts, and different sustaining bodies for the tank which are adapted to articulate in respect of the lateral supports and the shafts.

14. A vehicle for cleaning collector mirrors in installations for collecting solar thermal energy, according to claim 13, wherein the sustaining bodies comprise different anchorage plates and an extending device between said anchorage plates and the lateral supports.

15. A vehicle for cleaning collector mirrors in installations for collecting solar thermal energy, according to claim 14, wherein the anchorage plates comprise different slots for adjusting the extending device.

16. A vehicle for cleaning collector mirrors in installations for collecting solar thermal energy, according to claim 12, wherein the tray for collecting the water used in cleaning the mirrors has a longitudinal section formed of a plurality of concavities.

17. A vehicle for cleaning collector mirrors in installations for collecting solar thermal energy, according to claim 12, wherein the tank comprises a set of wheels for pulling the tank and a drainage conduit.

18. A vehicle for cleaning collector mirrors in installations for collecting solar thermal energy, according to claim 13, wherein the tray comprises a set of joining bodies coupling free ends of the sustaining bodies with said joining bodies and comprising:
an articulation axis;
a lower projection external to the tank; and
a support surface for the sustaining body.

\* \* \* \* \*